United States Patent

[11] 3,607,816

| [72] | Inventors | Klaus Holzer<br>Frankenthal;<br>Alfred Mueller, Biblis; Bernhard Dotzauer,<br>Ludwigshafen, all of Germany |
|---|---|---|
| [21] | Appl. No. | 830,131 |
| [22] | Filed | June 3, 1969 |
| [45] | Patented | Sept. 21, 1971 |
| [73] | Assignee | Badische Anilin- & Soda-Fabrik<br>Aktiengesellschaft<br>Ludwigshafen am Rhine, Germany |
| [32] | Priority | June 6, 1968 |
| [33] | | Germany |
| [31] | | P 17 69 528.2 |

[54] SOLUTIONS IN ORGANIC SOLVENTS OF COPOLYMERS OF ACRYLIC OR METHACRYLIC ESTERS
11 Claims, No Drawings

[52] U.S. Cl. ........................................................ 260/31.2 X,
260/32.6, 260/33.2, 260/33.6, 260/33.8,
260/80.73, 260/89.7

[51] Int. Cl. ........................................................ C08f 15/40,
C08f 45/30, C08f 55/36
[50] Field of Search ........................................... 260/32.6 A,
80.73, 31.2 X, 89.7

[56] References Cited
UNITED STATES PATENTS
3,258,443   6/1966   Cantor et al. .................   260/29.6

*Primary Examiner*—Morris Liebman
*Assistant Examiner*—Richard Zaitlen
*Attorney*—Johnston, Root, O'Keeffe, Keil, Thompson & Shurtleff

ABSTRACT: Solutions of solution copolymers of 60 to 90 percent of (meth) acrylic esters of alkanols containing from four to ten carbon atoms, 0.15 to 3 percent of olefinically unsaturated alkanediol monoesters and olefinically unsaturated alkoxymethylamides with or without up to 39 percent of other olefinically unsaturated monomers can be used for the production of contact adhesive layers having particularly advantageous properties.

SOLUTIONS IN ORGANIC SOLVENTS OF COPOLYMERS OF ACRYLIC OR METHACRYLIC ESTERS

Contact adhesive solutions based on organic solvents and copolymers of acrylic or methacrylic esters have long been known. They usually have very good surface tackiness and good bond strength and are usually transparent and resistant to ageing.

It is however a disadvantage of prior art contact adhesives based on polyacrylates that bonds prepared with these contact adhesives have fairly low thermal stability under load. Thermal stability of the bond under load means that the bond, when exposed to elevated temperature, for example in the temperature range of from about 80° to 100° C., does not substantially decline in strength as compared with the strength of the bond at room temperature, for example at 20° C. This requirement is for example placed on contact adhesives which are to be used for the production of insulating tape, as well as on contact adhesives for decorative sheeting or film, for example if the sheeting or film is to be stuck near a radiator.

Contact adhesives based on elastomeric polymers, for example natural and synthetic rubber and tackifying resins, particularly colophony derivatives, are known which have good surface tack and bond strength even at elevated temperatures. However, the transparency and resistance to ageing of such contact adhesives leave much to be desired.

It is an object of the present invention to provide solutions of polyacrylates which when they dry on a substrate give layers of contact adhesive which have good transparency and resistance to ageing and at the same time high surface tack and great bond strength even at elevated temperature.

We have now found that solutions of solution copolymers of acrylic and/or methacrylic esters in conventional organic solvents give bonds having improved thermal stability under load when they contain, as polymers of acrylic and/or methacrylic esters, those prepared from 60 to 97 percent by weight of acrylic and/or methacrylic esters of alkanols containing from four to ten carbon atoms together with 0.15 to 3 percent by weight of monoesters of olefinically unsaturated monocarboxylic acids and glycols and N-alkoxy methylamides of $\alpha, \beta$-olefinically unsaturated carboxylic acids with or without up to 39 percent by weight of other monoolefinic unsaturated monomers, whose glass temperature is from $-60°$ to $0°$ C. This "glass temperature" is sometimes referred to as the "second order transition temperature."

The copolymers of acrylic and methacrylic esters contained in the new solutions are prepared by the method of solution polymerization. The following acrylic and methacrylic esters of alkanols containing from four to 10 carbon atoms are particularly suitable: n-butyl acrylate, isobutyl acrylate, n-hexyl acrylate, 2-ethylhexyl acrylate, isononyl acrylate, isobutyl methacrylate, 2-ethylhexyl methacrylate and isooctyl methacrylate. The acrylic and methacrylic esters to be used as the main comonomers in the production of the copolymers are preferably derived from primary or secondary alkanols.

The copolymers also contain from 0.15 to 3 percent, preferably from 0.5 to 1 percent, by weight of polymerized units of monoesters of glycols and amides containing etherified N-hydroxymethyl groups. The proportion of polymerized units of glycol monoesters is preferably at least 0.1 percent by weight and the proportion of polymerized units of etherified N-hydroxymethylamide preferably at least 0.05 percent by weight. When the proportion of glycol monoester and etherified N-hydroxymethylamide together is 0.2 percent or more, particularly good results are achieved if the units of glycol monoester and those of etherified N-hyroxymethylamide are present in about equimolar amounts.

Suitable glycol monoesters of $\alpha,\beta$-olefinically unsaturated monocarboxylic acids include particularly those which are derived from $\alpha, \beta$-olefinically unsaturated monocarboxylic acids containing three to five carbon atoms, such as acrylic acid and methacrylic acid, and glycols preferably having from two to eight carbon atoms (or unsubstituted or substituted alkanediols preferably having from two to eight carbon atoms) such as ethylene glycol, 1,2-propanediol, 1,2-dihydroxy-3-chloropropane, butane-1,4-diol, hexane-1,6-diol, octane-1,8-diol, 2,2-dimethylpropane-1,3-diol and cycloalkanediols having from six to eight carbon atoms, such as cyclohexane-1,4-diol and cyclooctanediols. Examples of suitable glycol monoesters are ethylene glycol monoacrylate, ethylene glycol monomethacrylate, hexanediol monoacrylate, hexanediol monomethacrylate, 2-hydroxypropyl acrylate, 3-chloro-2-hydroxypropyl acrylate and 3-chloro-2-hydroxypropyl methacrylate. The glycol monoesters and alkanediol monoesters and cycloalkanediol monoesters are thus preferably derived from alkane and cycloalkanediols having from two to eight carbon atoms which may bear for example halogen atoms, particularly chlorine atoms, as substituents. Among the glycols bearing halogen atoms as substituents, monochloroalkanediols containing from two to six carbon atoms are preferred.

The N-alkoxymethylamides are generally derived from $\alpha,\beta$-olefinically unsaturated monocarboxylic or dicarboxylic acids having from three to five carbon atoms, for example from acrylic acid, methacrylic acid, methacrylic acid, maleic acid, fumaric acid, itaconic acid or crotonic acid and, when they are derived from dicarboxylic acids, they may contain two N-alkoxymethylamide groups.

The alkoxy groups of the N-alkoxymethylamides usually contain from one to four carbon atoms. Examples of particularly suitable N-alkoxymethylamides are N-methoxymethylacrylamide, N-methoxymethylmethacrylamide, N-ethoxymethylacrylamide, N-n-propoxymethylmethacrylamide, N-isopropoxymethylacrylamide, N-n-butoxymethylacrylamide, N-n-butoxymethylmethacrylamide, N-isobutoxymethylacrylamide and N-isobutoxymethylmethacrylamide. The following are also suitable: N- methoxymethylmaleamide, N-n-butoxymethylmaleic monoamide, N,N'-di-methoxymethylmaleic diamide and N-methoxymethylcrotonamide.

The acrylic and methacrylic ester copolymers contained in the contact adhesives may contain up to 39 percent by weight of other monoolefinically unsaturated monomers, particularly acrylic and methacrylic esters of alkanols having from one to three carbon atoms, such as methyl alcohol, ethyl alcohol, n-propyl alcohol and isopropyl alcohol, vinyl esters of saturated monocarboxylic acids containing from three to twelve carbon atoms, such as acetic acid, propionic acid, butyric acid and lauric acid, vinylaromatic monomers such as styrene, polymerizable heterocyclic monovinyl compounds such as 2-vinylpyridine 4-vinylpyridine, N-vinylimidazole, N-vinylcaprolactam, and N-vinylpyrrolidone, monoolefinically unsaturated monocarboxylic and dicarboxylic acids usually having from three to five carbon atoms and their amides and nitriles, such as acrylic acid, methacrylic acid, maleic acid, itaconic acid, acrylamide, methacrylamide, acrylonitrile and methacrylonitrile; in some cases vinyl ethers such as vinyl isobutyl ether, vinyl ketones and vinyl or vinylidene haliieds, particularly vinyl chloride and vinylidene chloride, are suitable as comonomers. The proportion of copolymerized units of the monoolefinically unsaturated carboxylic acids of the said type is generally only up to 10 percent, preferably from 0.5 to 5 percent, by weight, the proportion of units of amides of monoolefinically unsaturated carboxylic acids is generally up to 20 percent, preferably from 5 to 15 percent, by weight and the proportion of acrylonitrile units is generally up to 25 percent, preferably from 5 to 10 percent, by weight, in each case with reference to the acrylic or methacrylic ester copolymer. The copolymers usually have K values of from 60 to 140 (determined according to H. Fikentscher, "Cellulosechemie" 13 C (1932) page 58).

Suitable solvents for the contact adhesives in which the acrylic or methacrylic ester copolymers are generally dissolved in amounts of from 10 to 50 percent, preferably from 15 to 30 percent, by weight with reference to the mixture of solvent and copolymer, are particularly esters of acetic acid with linear or branched alcohols containing one to four carbon atoms, particularly ethyl acetate and n-butyl acetate, liquid aromatic hydrocarbons having boiling points of from 78° to 160° C., such as benzene, toluene and xylenes, liquid aliphatic ketones having boiling temperatures of from 55° to 160° C., such as cetone, cyclohexanone and methyl ethyl ketone, and liquid chloroparaffins whose boiling temperatures are usually from 60° to 165° C., such as chloroform, carbon tetrachloride, perchloroethylene and trichloroethylene, as well as dimethylformamide and aliphatic and cycloaliphatic ethers which contain from four to eight carbon atoms and one or two O-atoms such as diisobutyl ether, dioxane and tetrahydrofuran. Examples of suitable solvents which are chiefly of interest in admixture with the above-mentioned solvents are liquid saturated aliphatic hydrocarbons having boiling temperatures of from 60° to 165° C. such as gasoline fractions, cyclohexane, methylcyclohexane and dimethylcyclohexane. Specific examples of such mixtures are mixtures of gasolines (boiling temperature preferably from 60° to 120° C.) and acetone which contain from 50 to 80 percent by weight of gasoline and 20 to 50 percent by weight of acetone, and also mixtures of cyclohexane and toluene which contain from 50 to 75 percent of their weight of cyclohexane and 25 to 50 percent by weight of toluene. Such solvent mixtures containing aliphatic hydrocarbons are especially suitable when the solutions are to be used as contact adhesives for swellable substrates, for example polyvinyl chloride sheeting or film. The suitable solvents and solvent mixtures usually have boiling temperatures of from 55° to 165° C. and are conventionally used for contact adhesives. (The boiling temperatures given here relate to standard pressure, i.e., 760 mm. Hg.).

The copolymers of acrylates or methacrylates are generally prepared by conventional methods of solution polymerization from the monomers in solvents or solvent mixtures of the said type using conventional catalysts which are soluble in the solvents, for example organic peroxides, such as benzoyl peroxide, diisobutyl peroxide and lauroyl peroxide or readily decomposable azo compounds, particularly azobisbutyronitrile. In general, ethers, such as tetrahydrofuran or diisobutyl ether, are not used as solvents; they may however be used in special cases for diluting the polymer solutions. In addition to the polymers of acrylic esters, glycol monoesters and N-alkoxymethylamides the solutions, i.e., the contact adhesives, may contain other polymers such as polyisobutylenes and, with special advantage, modified colophony resins and/or polycondensates of cylclohexanone or methylcyclohexanones. Examples of suitable modified colophony resins are hydrogenated colophony and colophony which has been esterified with alcohols, for example monohydric to tetrahydric, linear or branched alcohols usually containing from one to 10, particularly from two to six, carbon atoms, such as methanol, ethanol, ethylene glycol, glycerol, pentaerythritol, butanediol-1,6, diethylene glycol, neopentyl alcohol and hexanediol-1,6. Suitable polycondensates of cyclohexanone and methylcyclohexanone generally have a degree of polycondensation of from 3 to 10. The modified colophony resins and polycondensates generally have softening points according to DIN 53,180 of at least 50° C., usually from 75° to 150° C. They are added to the contact adhesive solutions usually in an amount of from 5 to 50 percent, preferably from 15 to 30 percent, by weight with reference to the acrylate or methacrylate copolymer.

The new copolymer solutions may be used in conventional manner for the production of articles provided with a layer of contact adhesive, such as adhesive tapes, adhesive sheeting and film, decorative sheeting, and insulating tapes, and for coating the back of textile floor coverings. EXamples of substrates to which they may be applied are soda Kraft paper, aluminum foil, sheeting and film of polyethylene, polypropylene, polyvinyl chloride, polystyrene and polyethylene glycol terephthalate, wood veneers, bituminized board, textile floor coverings and nonwovens as well as expanded plastics materials of polyurethane, polyether, polyethylene, polyvinyl chloride, natural rubber and synthetic rubber foams in sheet form.

Application to such substrates may be carried out by conventional methods, for example by pouring or by using rollers or coating knives. The coat of contact adhesive is then generally dried at elevated temperature, usually at a temperature of from 70° to 150° C. Drying temperatures of from 90° to 130° C. are of special interest. At drying temperatures of from 130° to 150° C. there are obtained within only a few minutes contact adhesive coatings whose bond is distinguished by excellent thermal stability under load. Contact adhesive coatings which give bonds whose thermal stability under load is far better than that of bonds with conventional contact adhesive coatings are obtained even at drying temperatures of from 90° to 100° C.

Bonds which are distinguished by excellent thermal stability under load and which, at the same surface tack, are not inferior for example to bonds obtained with prior art contact adhesives based on natural or synthetic rubber and colophony or other tackifying resins, are obtained with the new solutions or contact adhesives. They are however far superior to these as regards transparency and resistance to ageing.

A process for the production of solvent-resistant curable plastics which will form films from dispersions or solutions is known from German Printed Application No. 1,102,410 according to which for example acrylic esters of alkanols containing from one to four carbon atoms are polymerized in emulsion or solution with from 5 to 15 percent by weight of a methylol or methylol ether compound of acrylamide or methacrylamide and from 2 to 15 percent by weight of a monomeric ester compound having at least one free alcoholic hydroxyl group, such as propanediol monoacrylate and glycerol monoacrylate. Products are thus obtained however which cross-link to such an extent after heating for a short time at from about 130° to 140° C. that they no longer exhibit surface tack. It is therefore surprising that it is possible to obtain from the solutions (contact adhesives) according to the present invention coatings on substrates which when heated for a short time do not lose their surface tack and which nevertheless give bonds which have an excellent thermal stability under load.

The invention is illustrated by the following examples.

The following examples contain numerical data regarding surface tack, bond strength and thermal stability under load of bonds which have been obtained with the solutions according to this invention. These data are determined as follows:

Surface Tack

Adhesive tapes about 25 cm., in length and 2 cm., in width are clamped in the upper jaws of a tension tester in the form of a loop suspended vertically in such a way that the adhesive layer is directed outwardly. The loop is then applied without the use of pressure to a horizontally secured highly polished steel rail at the rate of 150 mm., per minute. After the whole has been applied the tape is immediately pulled off from the steel rail at the same rate. The maximum measured value of the force required for pulling off the loop is registered. The value given is a mean value of ten measurements, a new tape being used each time and the steel rail being washed with gasoline between every tow measurements. Measurement is carried out in an air-conditioned room under the same temperature and humidity conditions with adhesive tapes which have been kept in the air-conditioned room for one day.

Bond Strength

An adhesive tape having a length of about 25 cm., and a width of 2 cm., is applied without the formation of air bubbles to a steel rail polished to a high gloss and pressed on by rolling 10 times with a steel roll covered with rubber and weighing 1 kilogram. After remaining for 24 hours in an air-conditioned room at 20° C., the adhesive tape is pulled off at a rate of 150 mm. per minute at an angle of 180°. The length tested is from 10 to 12 cm., of stuck tape. The force required to pull off the tape is measured. The value given is the mean value of ten individual measurements in each case.

Thermal Stability Under Load:

An adhesive tape having a width of 2 cm., is stuck without the formation of bubbles to a stainless steel rail over an area of 5 cm.$^2$. A 500-gram weight is then secured to the free end of the adhesive tape and the stainless steel rail with the weighted adhesive tape adhering thereto is suspended vertically in a drying cabinet so that the 500-gram weight hands freely. The arrangement is kept at a temperature of 150° C., and the time is measured which elapses before the piece of adhesive tape stuck to the stainless steel rail becomes detached from the rail. The measurement is repeated three times and the mean value is taken.

In the measurement of surface tack, bond strength and thermal stability under load, a transparent polyethylene glycol terephthalate film having a thickness of 40 microns is used to which contact adhesive has been applied at the rate of 22 to 25 g./m$^2$. The coatings are air-conditioned for 3 minutes at 150° C., after the evaporation of the solvent.

Parts and percentages given in the following examples are by weight. The glass temperatures given therein have been determined by the torsion vibration method at a frequency of 1 cyclo per second (for a description of the method of measurement see K. H. Illers and H. Brener, Kolloid-Zeitschrift, volume 176 (1961), page 110).

EXAMPLE 1 a. A polyester film is coated by a conventional method with an about 30 percent solution of a copolymer (glass temperature −46° C.) of 99.2 percent of a n-butyl acrylate, 0.4 percent of 1,4 -butanediol monoacrylate and 0.4 percent of N-n-butoxymethylmethacrylamide in a mixture of 70 parts of gasoline (boiling point from 65 ° to 95 ° C.) and 30 parts of acetone. The copolymer has a K value of 117 (1 percent in benzene). Drying is carried out at 120 ° C. and surface tack, bond strength and thermal stability under load are determined. Surface tack is 400 g./2 cm., bond strength is 390 g./2 cm. and in the measurement of the thermal stability under load the adhesive band has not become detached after it has been kept for 24 hours at 150 °C.

b. When a contact adhesive which additionally contains 20 parts of dihydro abietyl phthalate having the softening point 65 ° C. is used instead of the contact adhesive described under (a), an adhesive tape is obtained whose surface tack is 530 g./2 cm., and whose bond strength is 620 g./2 cm. In the case of this adhesive tape, too, the tape has not become detached after 24 hours in the test for thermal stability under load.

EXAMPLE 2 a. The procedure described in example 1 (a) is followed but a 25 percent solution of a copolymer (glass temperature −27° C., K value 131 ) of 70 percent of 2 -ethylhexyl acrylate, 29,3 percent of vinyl acetate, 0.4 percent of 1,4 -butanediol monoacrylate and 0.3 percent of N-methoxymethyl-methacrylamide in ethyl acetate is used. An adhesive tape is obtained having a surface tack of 510 g./2 cm., and a bond strength of 750 g./2 cm., and which does not become detached within 24 hours in the test for thermal stability under load.

b. The procedure of example 2 (a) is followed to make an adhesive tape but a contact adhesive is used which additionally contains 20 parts of dihydro abietyl phthalate having a softening point of 65° C. An adhesive tape is obtained whose surface tack is 830 g./2 cm., whose bond strength is 1,100 g./2 cm., and which similarly does not become detached within 24 hours in the test for thermal stability under load.

Comparative Tests

A. An adhesive tape is prepared as described in example 1 but a 25 percent solution in ethyl acetate of a copolymer, prepared by solution polymerization in the solvent, of 83.3 percent of ethyl acrylate, 11.1 percent of N-n-butoxymethyl-methacrylamide and 5.6 percent of its weight of ethylene glycol monomethyl acrylate is used. In the test of the resultant adhesive tape for surface tack, no adhesion to the polished steel rail is observed; this means that the surface tack is less than 20 g.

B. An adhesive tape is prepared as described in example 1 but an about 25 percent solution of poly-n-butyl acrylate (K value 112 1 percent in benzene; glass temperature −48° C. solution polymer) in a mixture of 75 parts of gasoline and 25 parts of acetone is used. An adhesive tape is obtained whose surface tack is 390 g./2 cm., and whose bond strength is 400 g./2 cm. Its thermal stability under load is only 10 minutes.

When a solution which additionally contains 20 parts of dihydro abietyl phthalate having a softening point of 65° C., is used in the production of the adhesive tape according to (B), an adhesive tape is obtained whose surface tack is 610 g./2 cm., and whose bond strength is 530 g./2 cm. Its thermal stability under load is only 7 minutes.

EXAMPLE 3

The procedure described in example 1 is followed but a 35 percent solution of a copolymer of 98.35 percent of n-decyl methacrylate; 1.5 percent of N-n-butoxymethylmaleamide mono-n-butyl ester and 0.15 percent of ethylene glycol monoacrylate (K value of the copolymer 65, glass temperature −35° C.) is used. An adhesive tape is obtained having the following properties:
surface tack: 0.73 kg./2 cm.
bond strength: 0.56 kg./2 cm.
thermal stability under load: tape does not become detached during 24 hours storage at 150° C.

EXAMPLE 4 a. The procedure of example 1 (a) is followed but a 28 percent solution of a copolymer of 97.15 percent of 2 -ethylhexyl acrylate, 2.6 percent of 1,4 -butanediol monoacrylate and 0.3 percent of N-methoxymethylacrylamide in a solvent mixture of 1 part of gasoline (boiling point 65° to 95° C.) and 2 parts of toluene (K value of the copolymer 91; glass temperature −58° C.).

An adhesive tape is obtained having the following properties:
surface tack 0.39 kg./2 cm.
bond strength: 0.35 kg./2 cm.
thermal stability under load: tape does not become detached during storage for 24 hours at 150° C.

b. An adhesive tape is prepared as described in example 4(a) but the contact adhesive layer contains additionally 25 percent (with reference to the acrylic acid polymer) of an ester of hydrogenated colophony and pentaerythritol having a softening point of 115 ° C. An adhesive tape is obtained having the following properties:
surface tack: 1.5 kg./2 cm.
bond strength: 0.6 kg./2 cm.
thermal stability under load: tape does not become detached during 24 hours storage at 150° C.

EXAMPLE 5 a. The procedure described in example 1(a) is followed but a 40 percent solution of a copolymer of 60 percent of n-decyl methacrylate, 37.25 percent of 2-ethylhexyl acrylate, 0.25 percent of 1,6-hexanediol monomethacrylate and 2.5 percent of N-n-butoxymethyl-anemaleamide mono-n-butyl ester (K valve 73, glass temperature from −41° to −43° C.) in ethyl acetate is used.

An adhesive tape is obtained having the following adhesive properties:
surface tack: 0.91 kg./2 cm.
bond strength: 0.6 kg./2 cm.
thermal stability under load; tape does not become detached during 24 hours storage at 150° C.

b. In the manner described in example 5 (a) an adhesive tape is prepared whose contact adhesive layer contains additionally 10 percent (with reference to the acrylic ester polymer) of dihydro abietyl phthalate having a softening point of 85° C.

The adhesive tape has the following properties:
surface tack: 1.4 kg./2 cm.
bond strength: 0.7 kg./2 cm.

thermal stability under load; tape does not become detached during storage for 24 hours at 150 C.

EXAMPLE 6 a. An adhesive tape is prepared as described in example 1(a) but a 25 percent solution of a copolymer of 60 percent of n-decyl methacrylate, 38.3 percent of n-octyl methacrylate, 0.7 percent of neopentylglykol monoacrylate, 0,7 percent of N-n-butoxymethylenecrotonamide and 0.3 percent of methacrylic acid (K value 62, glass temperature −29° C.) in ethyl acetate is used.

An adhesive tape is obtained having the following properties:
surface tack: 0.36 kg./2 cm.
bond strength: 1.1 kg./2 cm.
thermal stability under load; tape does not become detached during storage for 24 hours at 150° C.

b. An adhesive tape is prepared as described in example 6 (a) but its contact adhesive layer contains additionally 20 percent (with reference to the acrylic ester polymer) of a glycerol ester of hydrogenated colophony having a softening point of about 100° C.

It has the following properties:
surface tack: 0.8 kg./2 cm.
bond strength: 1.3 kg./2 cm.
thermal stability under load: tape does not become detached during storage for 24 hours at 150° C.

EXAMPLE 7 a. The procedure described in example 1(a) is followed but a 31 percent solution of a copolymer of 87.5 percent of 2-ethylhexyl acrylate, 9 percent of styrene, 2.75 percent of acrylic acid, 0.6 percent of N-n-butoxymethylacrylamide and 0.15 percent of 1,4-butanediol monoacrylate in a solvent mixture of equal parts of n-hexane, toluene and methyl ethyl ketone is used (K value of the polymer 98; glass temperature −47°C.).

An adhesive tape having the following properties is obtained:
surface tack: 0.4 kg./2 cm.
bond strength: 0.6 kg./2 cm.
thermal stability under load: tape does not become detached during storage for 24 hours at 150° C.

EXAMPLE 8 a. The procedure described in example 1(a) is followed but a 35 percent solution of a copolymer of 63,9 percent of n-octyl acrylate, 30 percent of ethyl acrylate, 5 percent of N-vinylpyrrolidone, 0.7 percent of 1.6-hexane diol monoitaconate and 0.4 percent of N-methoxymethylacrylamide in a mixture of 60 percent of cyclohexane and 40 percent of ethyl acetate is used (K value of the polymer 105; glass temperature −39°C.).

An adhesive tape is obtained having the following properties:
surface tack: 0.5 kg./2 cm.
bond strength: 0.9 kg./2 cm.
thermal stability under load: tape does not become detached during storage 824 hours at 150°C.

b. An adhesive tape is prepared as described in example 8(a), having a contact adhesive layer which additionally contains 25 percent (with reference to the acrylic ester polymer) of a commercial condensation product of cyclohexanone and methylcyclohexanone with a softening point of 88° C. An adhesive tape is obtained which has the following properties:
surface tack: 0.83 kg./2 cm.
bond strength: 1.0 kg./2 cm.
thermal stability under load: tape does not become detached during storage for 24 hours at 150° C.

EXAMPLE 9 a. The procedure described in example 1(a) is followed using a 25 percent solution of a copolymer of 85 percent of n-decyl acrylate, 10 percent of methyl methacrylate, 4.55 percent of acrylamide, 0.15 percent of 1,4-butanediol monoacrylate and 0.45 percent of N-isopropoxymethylacrylamide in a mixture of equal amounts by weight of n-heptane and toluene (K value of the polymer 103; glass temperature −51° C.).

An adhesive tape is obtained having the following properties:
surface tack: 0.75 kg./2 cm.
bond strength: 0.83 kg./2 cm.
thermal stability under load: tape does not become detached during storage for 24 hours at 150° C.

b. The procedure of (a) is followed but 10 percent (with reference to the acrylic ester polymer) of a condensation product of cyclohexanone having a softening point of 91° C. is additionally used in the polymer solution. An adhesive tape is obtained having the following properties:
surface tack: 1.5 kg./2 cm.
bond strength: 1.7 kg./2 cm.
thermal stability under load: tape does not become detached during storage for 24 hours at 150° C.

EXAMPLE 10 a. The procedure described in example 1 (a) is followed but a solution of a copolymer of 90 percent of n-decyl acrylate, 9.25 percent of acrylonitrile, 0.4 percent of 1,4-butanediol monoacrylate, 0.15 percent of N-n-butoxymethyleneacrylamide and 0.2 percent of itaconic acid in a solvent mixture of 60 percent of n-heptane, 20 percent of acetone, 20 percent of toluene (K value of the polymer 60; glass temperature −56° C.) is used.

The adhesive tape obtained has the following properties:
surface tack: 0.5 kg./2 cm.
bond strength: 0.4 kg./2 cm.
thermal stability under load: tape does not become detached during storage for 24 hours at 150°C.

b. An adhesive tape is prepared as described under 10 (a) having a contact adhesive layer which additionally contains 20 percent (with reference to the acrylic ester polymer) of a commercial condensation product of cyclohexanone and methylcyclohexanone having a softening point of 88° C.

The adhesive tape has the following properties:
surface tack: 0.97 kg./2 cm.
bond strength: 1.1 kg./2 cm.
thermal stability under load: tape does not become detached during storage for 24 hours at 150°C.

EXAMPLE 11 a. The procedure described in example 1 (a) is followed but a 27 percent solution of a copolymer of 98.75 percent of n-butyl acrylate, 1 percent of acrylic acid, 0.15 percent of 3-chloro-2-hydroxypropyl acrylate-1and 0.1 percent of N-methoxymethylenacrylamide in a mixture of 75 percent of gasoline (boiling point 65° to 95° C.) and 25 percent of acetone (K value of the polymer 127; glass temperature −44° C.) is used.

An adhesive tape is obtained having the following properties:
surface tack: 0.7 kg./2 cm.
bond strength: 1.24 kg./2 cm.
thermal stability under load: tape does not become detached during storage for 24 hours at 150°C.

b. The procedure described under 11(a) is followed and an adhesive tape is prepared whose adhesive layer additionally contains 20 percent (with reference to the acrylic ester polymer) of dihydroabietyl phthalate having a softening point of 65°C.

The adhesive tape has the following properties:
surface tack: 1.57 kg./2 cm.
bond strength: 1.2 kg./2 cm.

thermal stability under load: tape does not become detached during storage for 24 hours at 150° C.

We claim:
1. A composition comprising a solution in an organic solvent of a solution polymer of
   A. from 60 to 97 percent by weight of at least one ester selected from the group consisting of acrylic esters and methacrylic esters of alkanols containing from four to 10 carbon atoms;
   B. 0.15 to 3 percent by weight of at least one monoester of an α, β-olefinically unsaturated monocarboxylic acid and a glycol and (b) at least one N-alkoxymethylamide of an α, β-olefinically unsaturated carboxylic acid, the amount of the monoester (a) being at least 0.1 percent by weight and the amount of the N-alkoxymethylamide (b) being at least 0.05 percent by weight; and
   C. from 0 to 39 percent by weight of at least one other monoolefinically unsaturated monomer;
said solution polymer having a glass temperature of from −60° C. to 0° C.

2. A composition comprising a solution in an organic solvent having a boiling point of from 55° to 165° C. of from 15 to 30 percent by weight (with reference to the solution) of a solution polymer of
   A. from 60 to 97 percent by weight of at least one ester selected from the group consisting of acrylic and methacrylic esters of alkanols containing from four to 10 carbon atoms;
   B. from 0.15 to 3 percent by weight of at least one monoester of an α, β-olefinically unsaturated monocarboxylic acid containing from three to five carbon atoms and a glycol containing from two to eight carbon atoms; and (b) at least one N-alkoxymethylamide of a carboxylic acid containing from three to five carbon atoms whose alkoxy group contains from one to four carbon atoms, the amount of the monoester (a) being at least 0.1 percent by weight and the amount of the N-alkoxymethylamide (b) being at least 0.05 percent by weight: and
   C. from 0 to 39 percent by weight of at least one other monolefinically unsaturated monomer;
said solution polymer having a glass temperature of from −60° C. to 0° C.

3. A composition comprising a solution in an organic solvent having a boiling temperature of from 55° to 165° C. of from 15 to 30 percent by weight (with reference to the solution) of a solution copolymer of
   A. from 60 to 97 percent by weight of at least one ester selected from the group consisting of acrylic esters and methacrylic esters of alkanols containing from four to 10 carbon atoms;
   B. from 0.15 to 3 percent by weight of (a) least one monoester of an α, β-olefinically unsaturated monocarboxylic acid containing from three to five carbon atoms and a glycol selected from the group consisting of alkanediols containing from two to eight carbon atoms, cycloalkanediols containing from six to eight carbon atoms and monochloroalkanediols containing from three to six carbon atoms; and (b) at least one N-alkoxymethylamide of a carboxylic acid selected from the group consisting of α,β-olefinically unsaturated moncarboxylic and dicarboxylic acids containing from three to five carbon atoms and containing from one to four carbon atoms in the alkoxy group, the amount of the monoester (a) being at least 0.1 percent by weight and the amount of the N-alkoxymethylamide (b) being at least 0.05 percent by weight; and
   C. from 0 to 39 percent by weight of at least one other monolefinically unsaturated monomer;
said solution polymer having a glass temperature of from −60° C. to 0° C.

4. A composition as claimed in claim 2 wherein said solvent is selected from the group consisting of esters of acetic acid with alkanols containing from one to four carbon atoms, liquid aromatic hydrocarbons having boiling temperatures of from 78° to 160° C., liquid chloroparaffins having boiling temperatures of from 60° to 165° C., liquid aliphatic and cycloaliphatic ethers having from four to eight carbon atoms, and dimethylformamide.

5. A composition as claimed in claim 3 wherein said solvent is selected from the group consisting of esters of acetic acid with alkanols containing from one to four carbon atoms, liquid aromatic hydrocarbons having boiling temperatures of from 78° to 160° C,. liquid chloroparaffins having boiling temperatures of from 60° to 165° C., liquid saturated aliphatic hydrocarbons having boiling temperatures of from 60° to 165° C., liquid aliphatic ketones having boiling temperatures of from 55° to 160° C., aliphatic and cycloaliphatic ethers having from four to eight carbon atoms, and dimethylformamide.

6. A composition as claimed in claim 3 wherein said solvent is a mixture of from 50 to 80 percent by weight of gasoline having a boiling temperature of from 60° to 120° C. and from 20 to 150 percent by weight of acetone.

7. A composition as claimed in claim 3 wherein said solvent is a mixture of from 50 to 75 percent by weight of cyclohexane and 25 to 50 percent by weight of toluene.

8. A composition as claimed in claim 3 wherein said solvent is ethyl acetate.

9. A contact adhesive comprising a solution in an organic solvent having a boiling temperature of from 55° to 165° C. of
   I. from 15 to 30 percent by weight, with reference to the solution of a solution polymer of
      A. from 60 to 97 percent of at least one ester selected from the group consisting of acrylic and methacrylic esters of alkanols containing from four to ten carbon atoms,
      B. from 0.15 to 3 percent of (a) at least one monoester of an αβ-olefinically unsaturated monocarboxylic acid containing from three to five carbon atoms and a glycol containing from two to eight carbon atoms and (b) at least one N-alkoxymethylamide of a corboxylic acid containing from three to five carbon atoms whose alkoxy group contains from one to four carbon atoms, the amount of the monoester (a) being at least 0.1 percent by weight and the amount of the N-alkoxymethylamide (b) being at least 0.05 percent by weight, and
      C. from 0 to 39 percent of at least one other monoolefinically unsaturated monomer,
   said solution polymer having a glass temperature of from −60° C. to 0° C.; and
   II. from 5 to 50 percent by weight, with reference to the solution polymer (I), of another polymer selected from the group consisting of polyisobutylenes, modified colophony resins in which colophony or hydrogenated colophony is esterified with a monohydric to tetrahydric alcohol of one to ten carbon atoms, and polycondensates of cyclohexanone or methylcyclohexanones.

10. A contact adhesive as claimed in claim 9 wherein said solvent is a mixture of from 50 to 80 percent by weight of gasoline having a boiling temperature of from 60° to 120° C. and from 20 to 150 percent by weight of acetone.

11. A contact adhesive as claimed in claim 9 wherein said solvent is a mixture of from 50 to 70 percent of cyclohexane and from 25 to 50 percent by weight of toluene.

UNITED STATES PATENT OFFICE
CERTIFICATE OF CORRECTION

Patent No. 3,607,816          Dated September 21, 1971

Inventor(s) Klaus Holzer, Alfred Mueller, and Bernhard Dotzauer

It is certified that error appears in the above-identified patent and that said Letters Patent are hereby corrected as shown below:

First page, right-hand column, first line of the Abstract, "90" should read -- 97 --.

Column 2, line 53, "halieds" should read -- halides --.

Column 3, line 44, "cylclohexanone" should read -- cyclohexanone --; line 65, "EXamples" should read -- Examples --.

Column 4, line 57, "tow" should read -- two --.

Column 5, line 5, "hands" should read -- hangs --; line 29, "of a n-butyl" should read -- of n-butyl --; line 51, "29,3" should read -- 29.3 --.

Column 6, line 3, "112 1 percent in benzene; glass temperature -48° C." should read -- 112, 1 percent in benzene; glass temperature -48° C. ; --; line 39, "tack" should read -- tack: --; line 59, "N-n-butoxymethylanemaleamide" should read -- N-n-butoxymethylenemaleamide --; line 60, "valve" should read -- value --.

Column 7, line 1, "load;" should read -- load: --; line 9, "0,7" should read -- 0.7 --; line 51, "63,9" should read -- 63.9 --; line 53, "1.6" should read -- 1,6 --; line 64, "824" should read -- for twenty-four --.

Column 9, line 52, claim 3, "(a) least" should read -- (a) at least --; line 61, claim 3, "moncar-" should read -- monocar- --.

Column 10, line 34, claim 9, "solution of" should read -- solution, of --; line 40, claim 9, "$\alpha\beta$-olefinically" should read -- $\alpha,\beta$-olefinically --.

Signed and sealed this 4th day of April 1972.

(SEAL)
Attest:

EDWARD M. FLETCHER, JR.          ROBERT GOTTSCHALK
Attesting Officer                Commissioner of Patents